UNITED STATES PATENT OFFICE.

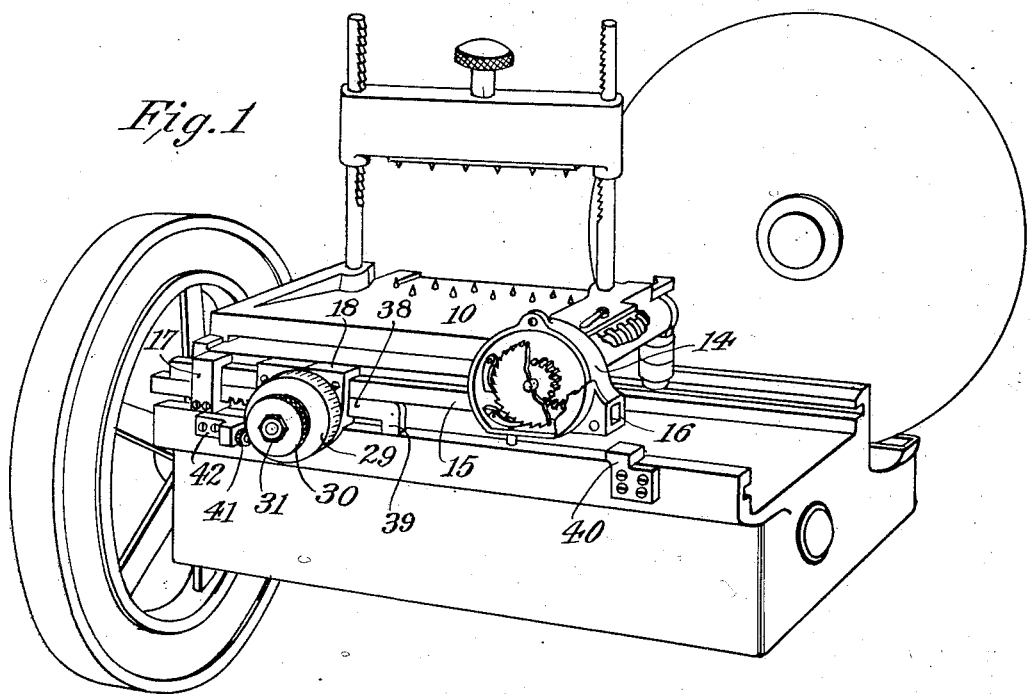
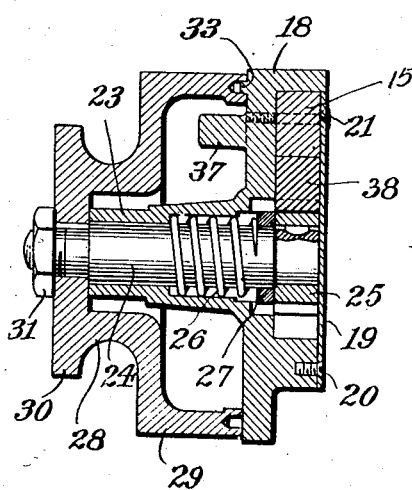

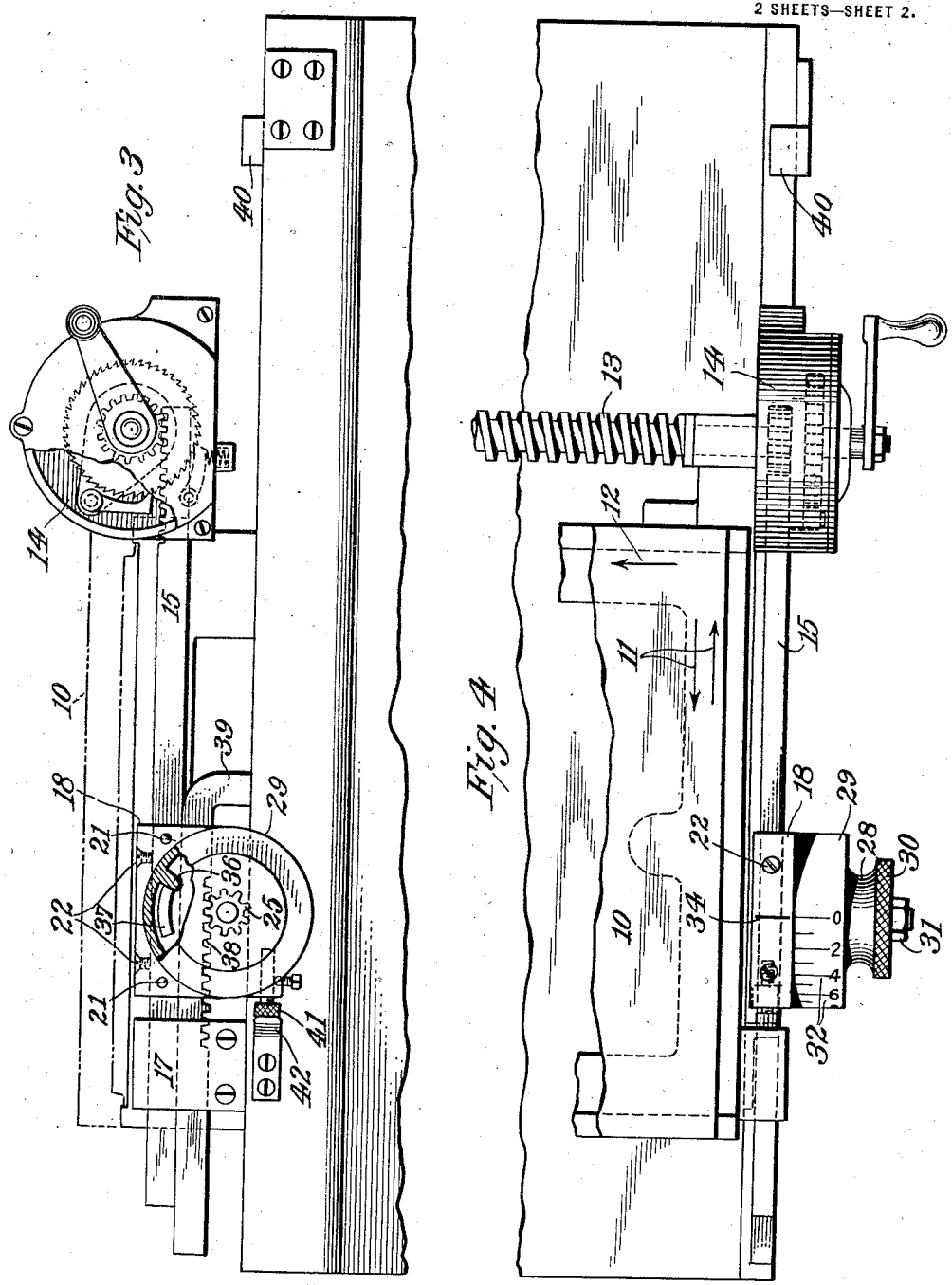

JOSEPH HOPKINSON, OF DAYTON, OHIO, ASSIGNOR TO THE COMPUTING SCALE COMPANY, OF DAYTON, OHIO, A CORPORATION OF OHIO.

TABLE-FEEDING DEVICE FOR MEAT-SLICERS.

1,356,284.     Specification of Letters Patent.     Patented Oct. 19, 1920.

Application filed March 3, 1920. Serial No. 363,031.

*To all whom it may concern:*

Be it known that I, JOSEPH HOPKINSON, a citizen of the United States of America, residing at Dayton, in the county of Montgomery and State of Ohio, have invented certain new and useful Improvements in Table-Feeding Devices for Meat-Slicers, of which the following is a full, clear, and exact description.

This invention relates to improvements in table feeding devices for meat slicers of the type shown in the patent to Hopkinson and Maltby No. 1,284,684, dated November 12, 1918. In the patent referred to means comprising an index supported upon the frame of the machine were provided for regulating the thickness of the slice of meat to be cut.

The present invention relates to a construction of index which is reciprocable with the meat table and which may be readily adjusted to vary the feed of the table.

The objects of the present invention reside in the provision of an index device that is simple and inexpensive to manufacture and which will not get out of order when in use.

Other objects of the present invention will be pointed out in detail in the accompanying specification and claims and shown in the drawings, in which:

Figure 1 shows a meat slicer with my improved index applied thereto.

Fig. 2 shows a vertical sectional view of the index.

Fig. 3 is a side view of the index and table feeding devices.

Fig. 4 is a top view of the parts shown in Fig. 3.

In more detail 10 is a meat plate which has the usual reciprocable movement as designated by the arrows 11 in Fig. 4. The meat plate also has a transverse movement as designated by the arrow 12. This movement is imparted by means of a feed screw 13 which is operated from cross or transverse feed devices contained in casing 14. The details of construction of the parts contained within the casing need not be here described as they are fully set forth in the patent heretofore referred to. It is sufficient to state that this movement is effected by means of a rack member 15 (part 45 in the prior patent) and the extent of the transverse feed is dependent upon the amount of longitudinal movement which this rack member receives at each reciprocation of the plate and supporting table.

The means for imparting longitudinal movement to the rack 15 and for controlling the relative amount of such movement with respect to the casing 14 will now be described.

Rack bar 15 is slidably mounted in guides 16 in casing 14 and in a bracket 17 attached to the reciprocating table. Intermediate the bracket 17 and casing 14 is a fixed index member 18 which is grooved to receive the rack 15. The member 18 is provided with a rear cover plate 19 best shown in Fig. 2. This cover plate is secured in position by suitable screws 20 and 21, the latter extending through the rack and taking into the front wall of the member beyond the rack. In order to secure the rack and member 18 together, I also provide screws 22 (see Figs. 3 and 4).

The member 18 which forms the fixed element of the index is provided with a projecting portion 23 which forms a bearing for a stub shaft 24. On the inner end of this shaft is keyed a pinion 25 and the projecting portion is hollowed out to receive a compression spring 26 which seats thereagainst at one end and at the opposite end bears against a collar 27 surrounding the shaft. The shaft 24 is reduced at the end and has keyed to it an index drum or cylinder 28. This index drum has a cylindrical part 29 and a knurled knob part 30. It is retained in position on the shaft by a nut 31. The periphery of the cylindrical part is provided with a graduated and numbered scale 32 and the edge of this part which bears against the face of member 18 is provided with a number of holes any one of which may receive a pin or projection 33 from said fixed member 18.

The top of member 18 is suitably marked with a neutral line 34. By grasping the knurled portion 30 and drawing the same outwardly, the spring will be compressed and the cylindrical portion 29 will be drawn away from the face of the fixed element 18 of the index. When the projection 33 clears the edge of the member the knurled knob can be rotated to bring any desired number line on the index drum into alinement with the neutral line 34. Thereafter the index drum will snap back toward the drum and the projection 33 will seat itself in one of the holes and prevent further rotational displacement of the fixed and movable index members. In order to prevent excessive rotational displacement of these parts I provide the inside of the index drum with a lug 36 which is adapted to abut against a lug 37 on the fixed index member 18 (see Fig. 3). These lugs limit the relative adjustment of the parts to slightly less than one complete rotation as will be readily understood.

The pinion 25 is adapted to mesh with an index rack 38 which is disposed below the rack 15 and slidable with respect thereto through the bracket 17. The index rack has a downwardly depending end 39.

The adjustment of the index drum heretofore described is adapted to project the index rack to a greater or less extent to the right as shown in Figs. 1 and 2. This index rack is adapted to impact against a fixed stop 40 just before the table reaches the end of its movement to the right and after contacting therewith the entire assemblage of index rack, index drum, fixed index and operating rack 15 will be moved to the left relatively to casing 14 and the parts contained therein. To restore these parts and move the rack 15 in the opposite direction the fixed index member 18 is provided with an adjustable plunger 41, which is adapted to contact with a second fixed stop 42 and restore the parts to the right upon the movement of the table to the left. The plunger 41 is adjustable in order to properly set the device so as to have zero or no feed when the neutral line alines with zero on the index drum.

The extent of shift of the rack 15 longitudinally to casing 14 controls the thickness of the slice and this extent of shift will correspond to the relative positions of the index rack and rack 15. The index rack in effect constitutes a variable stop which is carried by the rack member itself. This variable stop coöperates with a fixed stop 40; and plunger 41 in effect is a fixed stop carried by rack 15 which coöperates with a fixed stop 42. Adjusting the position of the index rack or variable stop determines the extent of transverse feed and this positioning is attained by the setting of the index drum 28 as previously explained.

The graduated members on the cylinder provide a ready means of setting the device for any desired thickness of slice, inasmuch as the thicknesses of slices progressively increase as larger numbers are alined with neutral line 34. It will be understood that with the number zero opposite this line 34 there will be no relative shift and no feed.

While I have herein shown the preferred embodiment of my invention, it will be understood that the same may be embodied in different forms within the scope of the appended claims.

I claim:

1. In a device of the class described, a rack member adapted to shift a meat plate transversely, said rack member being reciprocable in unison with a supporting table and also adapted to have imparted thereto a relative longitudinal movement to effect the transverse feed of the meat plate, means for effecting said relative longitudinal movement comprising a pair of fixed stops, and an adjustable and a fixed stop carried by the rack and adapted to coöperate therewith, said adjustable stop being adapted to be set relatively to the rack member to various relative positions to thereby vary the extent of longitudinal shift imparted to said member and to thereby control the extent of transverse feed of the meat plate.

2. In a device of the class described, in combination, a rack member having a movement of reciprocation and a relative longitudinal movement, said latter movement being adapted to effect the transverse feed of a meat plate, means for effecting said relative longitudinal movement comprising in combination a fixed index member carried by the rack, a movable index member carried by said fixed member, and rotatively displaceable with respect thereto, an index rack adapted to be variably positioned by said movable member, and fixed stops adapted to coöperate with said index rack and said fixed index member.

3. In a device of the class described, in combination, a rack member adapted to be reciprocated and to have a longitudinal movement imparted thereto by said movement of reciprocation, means for effecting said longitudinal movement comprising a fixed index member carried by the rack member, a movable index member carried by said fixed member and rotatively displaceable with respect thereto, a pinion rotatable with said movable member, an index rack meshing therewith, and variably positioned thereby upon the rotation of said movable member, and fixed stops adapted to coöperate with said index rack and said fixed index to displace the said rack member.

4. In a device of the class described, in combination, a rack member adapted to be reciprocated and to have a relative longitudinal movement imparted thereto by said movement of reciprocation, means for effecting said longitudinal movement comprising a pair of fixed stops, means carried by said rack member and adapted to abut therewith to move the said rack longitudinally, said means including an adjustable stop member having means for adjusting the same to vary the relative position of the fixed stop and said member.

5. In a device of the class described, in combination, a rack member adapted to be reciprocated and to have a relative longitudinal movement imparted thereto by said movement of reciprocation, means for effecting the said longitudinal movement comprising a pair of fixed stops, and means coöperating therewith and carried by the rack adapted to displace the said rack longitudinally, said means comprising in part an index rack, and a fixed index member carried by and reciprocable with said rack member and an index drum adapted to be variably positioned relative to the fixed index member and to thereby vary the position of the index rack, said index rack by its varying positions being adapted to vary the extent of movement imparted to the rack.

6. A feed adjusting device for a meat slicer plate, said plate being adapted to be advanced transversely by imparting a relative displacement to a reciprocable actuating rack, comprising in combination, a pair of stop devices carried by stationary parts of the machine, coöperating stop devices carried by the rack, one of which is adjustable at will relatively to the said rack and to its coöperating fixed stop, and means for adjusting the relative position of the other stop device carried by the rack and its coöperating stop carried by the stationary part of the machine.

7. A feed adjusting device for a meat slicer plate adapted to be fed transversely by imparting a relative displacement to a reciprocable actuating rack comprising in combination, a pair of fixed stops carried by stationary parts of the machine, and a coöperating pair of adjustable stops carried by the reciprocating rack and adapted upon contact with the aforesaid fixed stops to impart a relative displacement to said rack.

8. A feed adjusting device for a meat slicer plate adapted to be fed transversely by imparting a relative displacement to a reciprocable actuating rack comprising in combination, a pair of fixed stops carried by stationary parts of the machine, and a coöperating pair of adjustable stops carried by the reciprocating rack and adapted upon contact with the aforesaid fixed stops to impart a relative displacement to said rack, one of said stops being adapted to be set initially for zero settings and the other of said stops being adapted to be set at will to vary the extent of displacement of said rack.

9. In a feeding device for a meat slicer having a meat plate adapted to be fed transversely by relatively moving an actuating rack, in combination, an index device for controlling the extent of movement of said rack, said device comprising a fixed index member carried by the rack, a movable index member carried by the aforesaid index member and adjustable relatively thereto, means adjustable upon the relative adjustment of the movable and fixed index constituting an adjustable stop for the rack, and coöperating stop means for contact with said adjustable stop, and a second stop carried by the actuating rack for relatively displacing the rack upon the reciprocation thereof.

In testimony whereof I hereunto affix my signature.

JOSEPH HOPKINSON.